United States Patent
Ohira

(10) Patent No.: US 10,718,576 B2
(45) Date of Patent: Jul. 21, 2020

(54) ION EXCHANGER

(71) Applicant: TOYOTA BOSHOKU KABUSHIKI KAISHA, Aichi-ken (JP)

(72) Inventor: Junko Ohira, Kariya (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/656,093

(22) Filed: Jul. 21, 2017

(65) Prior Publication Data

US 2018/0058781 A1 Mar. 1, 2018

(30) Foreign Application Priority Data

Aug. 24, 2016 (JP) .................................. 2016-163309

(51) Int. Cl.
*B01D 15/36* (2006.01)
*F28F 19/01* (2006.01)
(Continued)

(52) U.S. Cl.
CPC .............. *F28F 19/01* (2013.01); *B01D 15/18* (2013.01); *B01D 15/362* (2013.01);
(Continued)

(58) Field of Classification Search
CPC .... B01D 15/18; B01D 15/362; B01D 15/363; F28F 19/01; H01M 8/04029;
(Continued)

(56) References Cited

U.S. PATENT DOCUMENTS 4,851,122 A * 7/1989 Stanley ................... B01J 39/04
210/501
2009/0317680 A1* 12/2009 Imamura ........... H01M 8/04029
429/413

(Continued)

FOREIGN PATENT DOCUMENTS

JP    10-174967    6/1998
JP    2002-136968    5/2002

(Continued)

OTHER PUBLICATIONS

Japanese Office Action in counterpart Japanese Patent Application No. 2016-163309, dated Feb. 25, 2020 (and English translation thereof).

*Primary Examiner* — Patrick Orme
(74) *Attorney, Agent, or Firm* — Greenblum & Bernstein, P.L.C.

(57) ABSTRACT

An ion exchanger includes a case having an inflow hole and an outflow hole. The case accommodates a tube. A first passage is defined between the case and the tube. A second passage is defined in the tube. A first end of the first passage and a first end of the second passage are connected to each other. The first passage includes a lower portion defining a lower accommodation portion that is filled with an anion exchange resin. The first passage includes an upper accommodation portion located above the lower accommodation portion. The upper accommodation portion is filled with a cation exchange resin. The upper accommodation portion has a smaller volume and a smaller refrigerant flow area than the lower accommodation portion.

11 Claims, 2 Drawing Sheets

(51) Int. Cl.
*H01M 8/04044* (2016.01)
*B01D 15/18* (2006.01)
*H01M 8/04029* (2016.01)

(52) U.S. Cl.
CPC ...... *B01D 15/363* (2013.01); *H01M 8/04029* (2013.01); *H01M 8/04044* (2013.01); *H01M 2250/20* (2013.01); *Y02P 70/56* (2015.11); *Y02T 90/32* (2013.01)

(58) Field of Classification Search
CPC ........... H01M 8/04044; H01M 2250/20; B01J 39/22; B01J 41/12; B01J 47/02; B01J 47/026; B01J 47/028; B01J 47/06; C02F 1/42; C02F 2001/427
See application file for complete search history.

(56) References Cited

U.S. PATENT DOCUMENTS

2014/0263014 A1\* 9/2014 Moser ..................... C02F 1/003
 210/202
2015/0225259 A1\* 8/2015 Yamaoka ................. C02F 1/42
 137/865

FOREIGN PATENT DOCUMENTS

JP 2011-041878 3/2011
JP 2013-180287 9/2013

\* cited by examiner

ION EXCHANGER

BACKGROUND OF THE INVENTION

The present invention relates to an ion exchanger.

When a fuel cell is installed in a vehicle or the like, the vehicle includes a cooling circuit through which a refrigerant that cools the fuel cell flows. The cooling circuit limits temperature increases of the battery cell when power is generated.

When a cooling circuit is still new and has just been manufactured, the ions (cations) eluted from the piping of the cooling circuit increase the amount of ions in the refrigerant. The eluted cations in the refrigerant gradually decrease over time. However, when the refrigerant cools the fuel cell, the components in the refrigerant undergo thermal decomposition. This generates ions (anions) and increases the ions in the refrigerant.

When the ions in the refrigerant increase in such a manner, erosion may occur in the metal parts of the cooling circuit. Further, the electric conductivity of the refrigerant may increase and lower the performance of the fuel cell. Thus, the cooling circuit includes an ion exchanger that removes ions from the refrigerant. Japanese Laid-Open Patent Publication Nos. 2002-136968 and 10-174967 disclose examples of ion exchangers known in the art.

In the ion exchangers of the two publications, an ion exchange resin is arranged in a case that includes an inflow hole and an outflow hole. When the refrigerant flows through the inflow hole into the case and passes through the ion exchange resin, the ion exchange resin removes ions from the refrigerant through ion exchange. After the ions are removed, the refrigerant flows out of the case through the outflow hole. The ion exchange resin includes a cation exchange resin that removes cations and an anion exchange resin that removes anions.

In the ion exchanger, the contained amount of ion exchange resin is limited. Thus, when the contained amount of the cation exchange resin is set to obtain the cation removal efficiency that is necessary immediately after the cooling circuit is manufactured, the contained amount of the anion exchange resin decreases. Thus, when the anions in the refrigerant increase as a certain period of time elapses, the anion removal efficiency becomes insufficient. When the contained amount of the anion exchange resin is set to obtain the anion removal efficiency that is necessary when the anions in the refrigerant increase after a certain period of time elapses, the contained amount of the cation exchange resin decreases. Thus, when the amount of eluted cations in the refrigerant increases immediately after the cooling circuit is manufactured, the cation removal efficiency becomes insufficient.

SUMMARY OF THE INVENTION

It is an object of the present invention to provide an ion exchanger that provides the necessary efficiency for removing cations from the refrigerant immediately after a cooling circuit is manufactured and provides the necessary efficiency for removing anions from the refrigerant after a certain period of time elapses from when the cooling circuit is manufactured.

To achieve the above object, an ion exchanger according to one aspect of the present invention includes a case and an ion exchange resin. The case includes an inflow hole into which a refrigerant flows and an outflow hole out of which the refrigerant flows. The ion exchange resin is arranged in the case to remove ions from the refrigerant. The inflow hole and the outflow hole are located in one of an upper portion and a lower portion of the case. The case accommodates a tube extending in a vertical direction. A first passage is defined between an inner wall of the case and an outer wall of the tube. A second passage is defined in the tube. The first passage and the second passage each include a first end and a second end. The first end of the first passage and the first end of the second passage are connected to each other. The second end of the first passage and the second end of the second passage are not connected to each other. One of the second end of the first passage and the second end of the second passage is connected to the inflow hole, and the other one of the second end of the first passage and the second end of the second passage is connected to the outflow hole. The first passage includes a lower portion defining a lower accommodation portion that is filled with an anion exchange resin serving as the ion exchange resin. The first passage includes an upper accommodation portion located above the lower accommodation portion. The upper accommodation portion is filled with a cation exchange resin serving as the ion exchange resin. The upper accommodation portion is located adjacent to the lower accommodation portion. The upper accommodation portion has a smaller volume and a smaller refrigerant flow area than the lower accommodation portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of an ion exchanger will now be described with reference to FIGS. 1 to 4.

Figure 1:
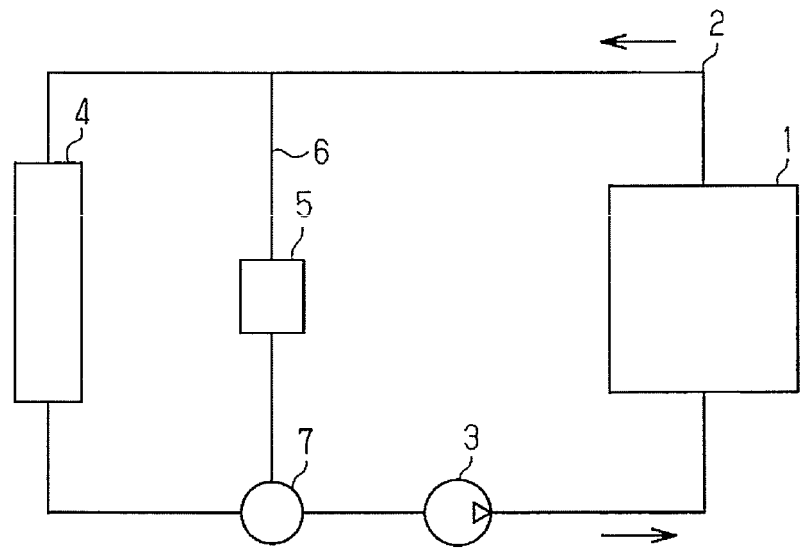
FIG. 1 is a diagram showing the entire structure of a cooling circuit including an ion exchanger according to one embodiment of the present invention.

As shown in FIG. 1, a vehicle in which a fuel cell 1 is installed includes a cooling circuit 2. A refrigerant that cools the fuel cell 1 flows through the cooling circuit 2. Coolant (long life coolant) containing ethylene glycol is used as such a refrigerant. In the cooling circuit 2, a pump 3 is driven to circulate the refrigerant.

In the cooling circuit 2, the fuel cell 1 is located at a downstream side of the pump 3. A radiator 4 is located at a downstream side of the fuel cell 1 and an upstream side of the pump 3. The fuel cell 1 that increases in temperature when generating power is cooled by the coolant, which circulates in the cooling circuit 2 and passes through the fuel cell 1. The refrigerant that draws heat from the fuel cell 1 and increases in temperature is cooled by air when passing through the radiator 4. Then, the refrigerant flows into the pump 3.

The cooling circuit 2 includes an ion exchanger 5, which removes ions from the refrigerant and a bypass pipe 6, through which the refrigerant flows to the ion exchanger 5. The ion exchanger 5 is located in the bypass pipe 6. One end of the bypass pipe 6 is connected to a portion of the cooling circuit 2 located at a downstream side of the fuel cell 1 and an upstream side of the radiator 4. The other end of the bypass pipe 6 is connected by a valve 7 to a portion of the cooling circuit 2 located at a downstream side of the radiator 4 and an upstream side of the pump 3.

The valve 7 selectively opens and closes and determines whether or not the refrigerant that passes through the fuel cell 1 flows into the bypass pipe 6 (ion exchanger 5). More specifically, when the valve 7 is closed, the refrigerant flows into the radiator 4 instead of the bypass pipe 6. When the valve 7 is open, some of the refrigerant that passes through the fuel cell 1 flows into the bypass pipe 6 instead of the radiator 4. Ions are removed from the refrigerant flowing into the bypass pipe 6 in such a manner when the refrigerant passes through the ion exchanger 5. Subsequently, the refrigerant flows into the portion of the cooling circuit 2 located at the downstream side of the radiator 4 and the upstream side of the pump 3.

The structure of the ion exchanger 5 will now be described.

Figure 2:
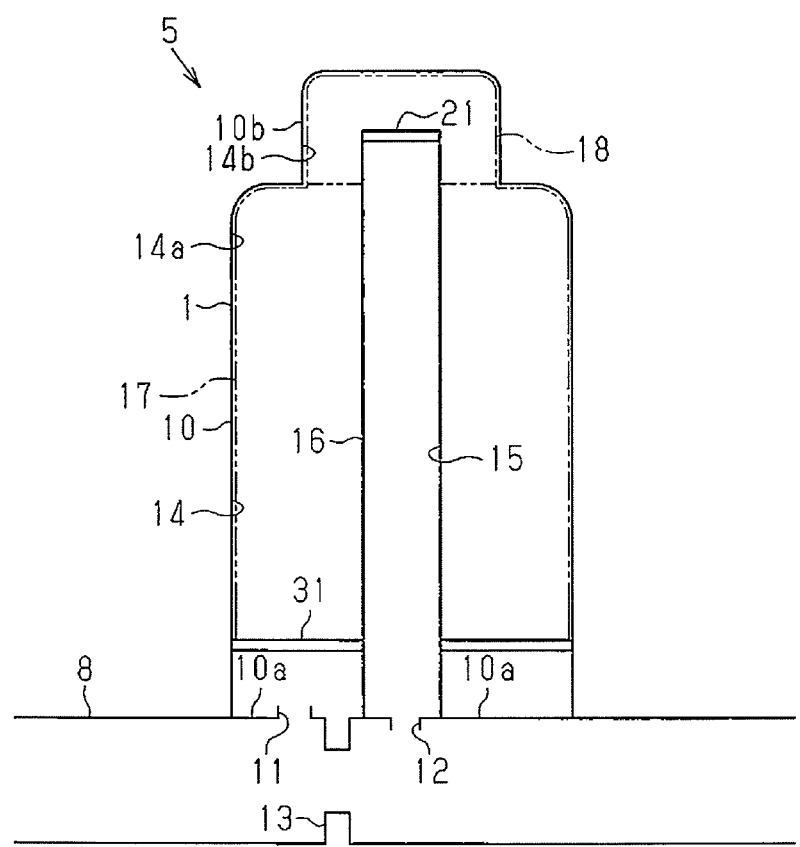
FIG. 2 is a diagram of the structure of the ion exchanger shown in FIG. 1.

As shown in FIG. 2, the ion exchanger 5 includes a case 10 with an inflow hole 11 into which a refrigerant flows and an outflow hole 12 out of which the refrigerant flows. The ion exchanger 5 further includes a refrigerant pipe 8, which is connected to the bypass pipe 6 (FIG. 1) and through which a refrigerant flows. The case 10 is tubular and has an upper end that is closed and a lower end that is formed integrally with the refrigerant pipe 8, which extends in the horizontal direction. The case 10 includes a partition wall 10a located between the case 10 and the refrigerant pipe 8. The inflow hole 11 and the outflow hole 12 extend through the partition wall 10a.

The case 10 accommodates a tube 16 extending in the vertical direction. The lower end of the tube 16 is in communication with the outflow hole 12 extending through the partition wall 10a of the case 10. The inflow hole 11, which communicates the refrigerant pipe 8 and the case 10, is located in the partition wall 10a at an upstream side of the outflow hole 12 in the direction in which the refrigerant flows in the refrigerant pipe 8 (direction from left toward right as viewed in FIG. 2). A reduced diameter portion 13 having a smaller refrigerant flow area than other portions of the refrigerant pipe 8 is located between the inflow hole 11 and the outflow hole 12 in the refrigerant pipe 8.

In the ion exchanger 5, a first passage 14 is defined between an inner wall of the case 10 and an outer wall of the tube 16, and a second passage 15 is defined in the tube 16. Refrigerant flows through the first passage 14 and the second passage 15. The first passage 14 and the second passage 15 each include an upper end (first end) and a lower end (second end). The first passage 14 and the second passage 15 are connected to each other at the upper ends (first ends) but not at the lower ends (second ends). One of the lower ends of the first passage 14 and the second passage 15 (in this example, lower end of first passage 14) is connected to the inflow hole 11, and the other one of the lower ends of the first passage 14 and the second passage 15 (in this example, lower end of second passage 15) is connected to the outflow hole 12.

A lower portion of the first passage 14 defines a lower accommodation portion 14a containing an ion exchange resin that removes ions from the refrigerant. The lower accommodation portion 14a contains an anion exchange resin 17 that serves as the ion exchange resin and removes anions (ions) from the refrigerant. A mesh 31 that allows the passage of refrigerant and restricts the passage of the ion exchange resin is located at the lower side of the lower accommodation portion 14a in the first passage 14.

Further, a portion of the first passage 14 located above the lower accommodation portion 14a defines an upper accommodation portion 14b. The upper accommodation portion 14b contains a cation exchange resin 18 that serves as the ion exchange resin and removes cations (ions) from the refrigerant. The upper accommodation portion 14b is located adjacent to the lower accommodation portion 14a. An upper end of the tube 16 is located in the upper accommodation portion 14b. A mesh 21 that allows the passage of the refrigerant and restricts the passage of the ion exchange resin is arranged at the upper end of the tube 16.

The case 10 includes an upper end defining a small diameter portion 10b that has a smaller diameter than other portions of the case 10. The upper accommodation portion 14b is arranged in a portion of the first passage 14 that corresponds to the inner side of the small diameter portion 10b. Thus, the upper accommodation portion 14b has a smaller volume and a smaller refrigerant flow area than the lower accommodation portion 14a.

The operation of the ion exchanger 5 will now be described.

When the refrigerant in the cooling circuit 2 passes through the bypass pipe 6, the refrigerant flows into the refrigerant pipe 8 of the ion exchanger 5, which is arranged in the bypass pipe 6. The refrigerant flowing through the refrigerant pipe 8 is separated into refrigerant that passes through the reduced diameter portion 13 and flows downstream and refrigerant that passes through the case 10 of the ion exchanger 5 instead of the reduced diameter portion 13 and flows toward the downstream side of the reduced diameter portion 13. In such a manner, the flow rate of the refrigerant passing through the case 10 is set by the size of the refrigerant flow area at the reduced diameter portion 13.

The refrigerant that flows through the inflow hole 11 into the case 10, instead of through the reduced diameter portion 13, passes through the mesh 31 and then flows in the first passage 14 from the lower side to the upper side. Subsequently, the refrigerant passes through the mesh 21 and then flows through the second passage 15 from the upper side to the lower side. When the refrigerant passes through the first passage 14, the ion exchange resins (anion exchange resin 17 and cation exchange resin 18) remove ions (cations and anions) from the refrigerant through ion exchange. After the ions are removed, the refrigerant flows out of the case 10 through the outflow hole 12 into the refrigerant pipe 8.

Figure 3:
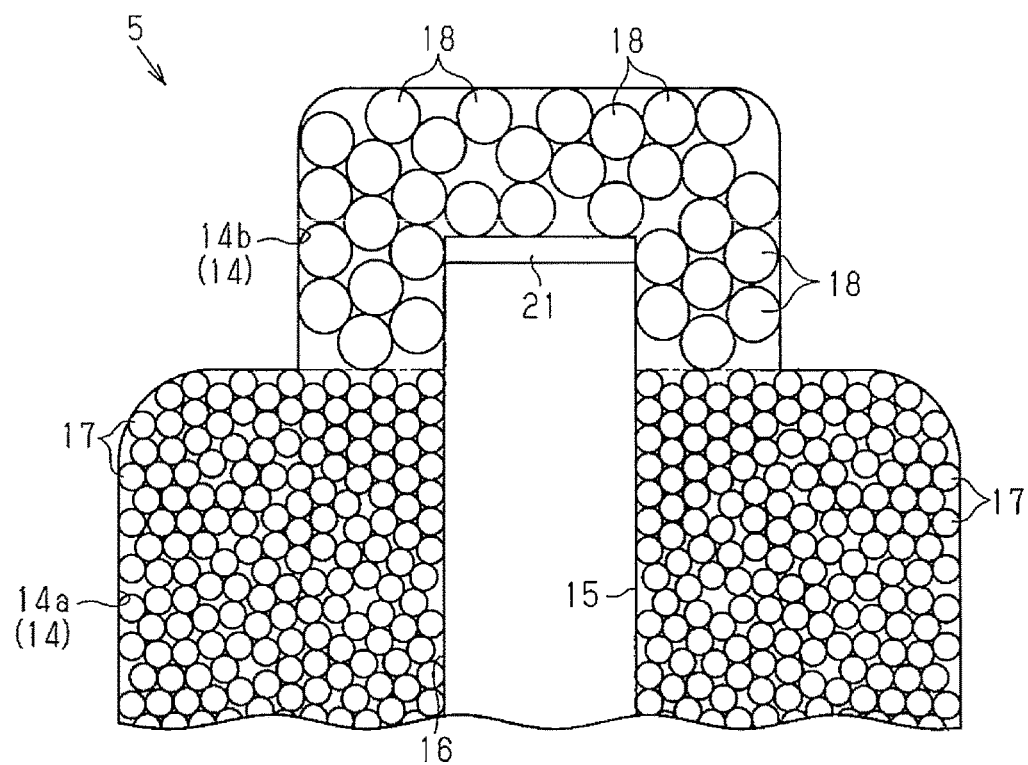
FIG. 3 is a diagram showing a cation exchange resin and an anion exchange resin of FIG. 2 in the ion exchanger.

As shown in FIG. 3, immediately after the cooling circuit 2 is manufactured, the lower accommodation portion 14a of the first passage 14 of the ion exchanger 5 is filled with beads of the anion exchange resin 17, and the upper accommodation portion 14b is filled with beads of the cation exchange resin 18. The upper accommodation portion 14b has a smaller refrigerant flow area than the lower accommodation portion 14a. Thus, when the refrigerant passes through the upper accommodation portion 14b, the refrigerant efficiently contacts the cation exchange resin 18 in the upper accommodation portion 14b, and the cation exchange resin 18 effectively removes cations from the refrigerant through ion exchange. Thus, when the amount of eluted cations in the refrigerant increases immediately after the cooling circuit 2 is manufactured, the efficiency for removing cations from the refrigerant is sufficient.

As a certain period of time elapses from when the cooling circuit 2 is manufactured, the weight of the cation exchange resin 18, which has a larger specific gravity than the anion exchange resin 17, causes the cation exchange resin 18 to gradually descend from the upper accommodation portion 14b to the lower accommodation portion 14a. This forcibly lifts some of the beads of the anion exchange resin 17 in the lower accommodation portion 14a into the upper accommodation portion 14b. As a result, the cation exchange resin 18 and the anion exchange resin 17 are mixed in the upper accommodation portion 14b and the lower accommodation portion 14a.

Figure 4:
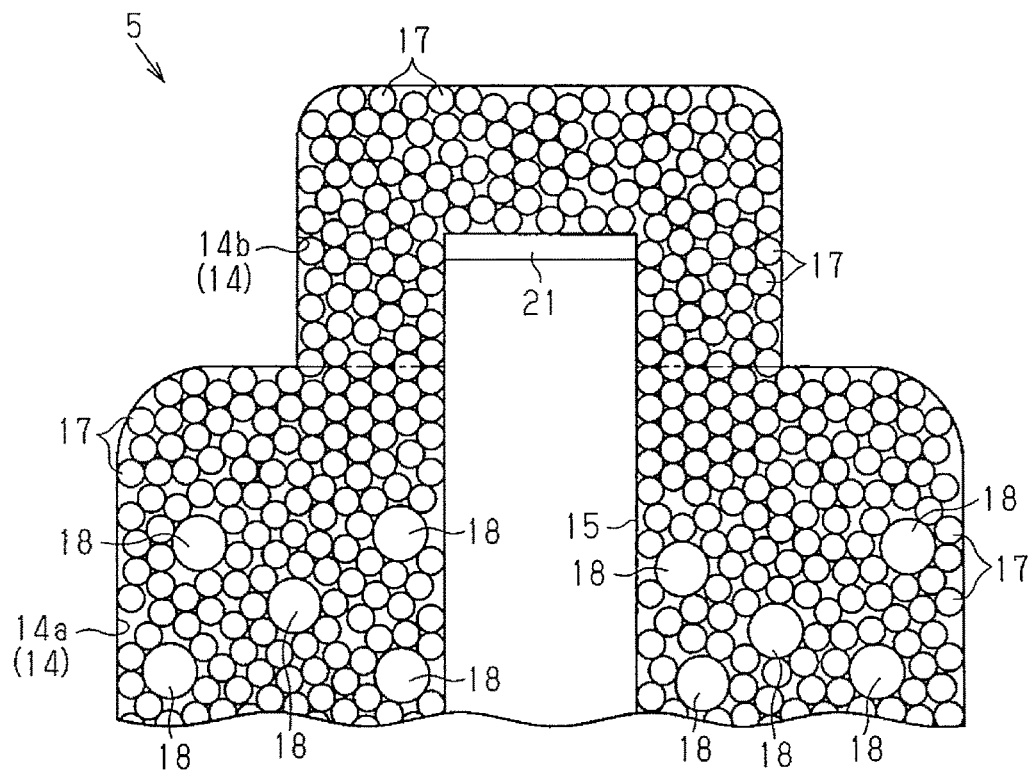
FIG. 4 is a diagram showing a state in which the cation exchange resin and the anion exchange resin of FIG. 3 are mixed.

FIG. 4 shows a state in which the cation exchange resin 18 and the anion exchange resin 17 are mixed. The anion exchange resin 17 had been contained in the lower accommodation portion 14a, which has a larger volume than the upper accommodation portion 14b. Thus, the contained amount of the anion exchange resin 17 is greater than the amount of the cation exchange resin 18 that was contained in the upper accommodation portion 14b. Accordingly, even when the anion exchange resin 17 and the cation exchange resin 18 are mixed as described above, the cation exchange resin 18 does not cause inefficient contact of the anion exchange resin 17. Thus, when the anions in the refrigerant increase after a certain period of time elapses from when the cooling circuit 2 is manufactured, the anion exchange resin 17, which is greater in amount than the cation exchange resin 18, effectively removes anions through ion exchange.

Accordingly, when the anions in the refrigerant increase after a certain period of time elapses from when the cooling circuit 2 is manufactured, the efficiency for removing anions from the refrigerant remains sufficient.

The present embodiment has the advantage described below.

(1) The efficiency for removing cations from the refrigerant is sufficient immediately after the cooling circuit 2 is manufactured. Further, the efficiency for removing anions from the refrigerant is sufficient after a certain period of time elapses from when the cooling circuit 2 is manufactured.

It should be apparent to those skilled in the art that the present invention may be embodied in many other specific forms without departing from the spirit or scope of the invention. Particularly, it should be understood that the present invention may be embodied in the following forms.

The present invention is applicable to an ion exchanger that includes an inflow hole and an outflow hole at an upper portion of the case. In this case, the first passage and the second passage each include a lower end (first end) and an upper end (second end). The first passage and the second passage are connected to each other at the lower ends (first ends). The upper end (second end) of the first passage is connected to the inflow hole, and the upper end (second end) of the second passage is connected to the outflow hole. In the first passage, the upper accommodation portion is located adjacent to an upper end of the lower accommodation portion.

The non-connected ends of the first passage and the second passage (i.e., second ends) may be connected to the inflow hole and the outflow hole in a manner reversed from the above embodiment. That is, the inflow hole may be connected to the second passage, and the outflow hole may be connected to the first passage.

The present examples and embodiments are to be considered as illustrative and not restrictive, and the invention is not to be limited to the details given herein, but may be modified within the scope and equivalence of the appended claims.

The invention claimed is:

1. An ion exchanger comprising:
a case including an inflow hole into which a refrigerant flows and an outflow hole out of which the refrigerant flows; and
an ion exchange resin arranged in the case to remove ions from the refrigerant, wherein
the inflow hole and the outflow hole are located in one of an upper portion and a lower portion of the case,
the case accommodates a tube extending in a vertical direction,
a first passage is defined between an inner wall of the case and an outer wall of the tube,
a second passage is defined in the tube,
the first passage and the second passage each include a first end and a second end,
the first end of the first passage and the first end of the second passage are connected to each other,
the second end of the first passage and the second end of the second passage are not connected to each other,
one of the second end of the first passage and the second end of the second passage is connected to the inflow hole and the other one of the second end of the first passage and the second end of the second passage is connected to the outflow hole,
the first passage includes a lower accommodation portion that is, in an initial configuration prior to any refrigerant flow there through, filled with an anion exchange resin serving as the ion exchange resin,
the first passage includes an upper accommodation portion located above the lower accommodation portion, wherein the upper accommodation portion is, in the initial configuration prior to any refrigerant flow there through, filled with a cation exchange resin serving as the ion exchange resin,
the upper accommodation portion is located adjacent to the lower accommodation portion,
an upper portion of the case that forms the upper accommodation portion has a first cylindrical shape with a first uniform diameter extending from the lower accommodation portion towards a top of the case,
a lower portion of the case that forms the lower accommodation portion has a second cylindrical shape with a second uniform diameter, larger than the first uniform diameter, extending from the inflow and outflow holes towards the upper accommodation portion,
the tube protrudes into the upper portion of the case and defines an interior extent of the upper accommodation portion, and
the upper accommodation portion has a smaller volume and a smaller refrigerant flow area than the lower accommodation portion.

2. The ion exchanger according to claim 1, wherein the inflow hole and the outflow hole are located in the lower portion of the case,
and
the upper accommodation portion is arranged in a portion of the first passage that corresponds to an inner side of the first cylindrical shape with the first uniform diameter.

3. The ion exchanger according to claim 1, wherein the inflow hole and the outflow hole are located in the lower portion of the case in a direction of gravity, and the ion exchanger is configured so that, subsequent to the initial configuration and subsequent to refrigerant flow there through:

weight of the cation exchange resin causes the cation exchange resin to descend from the upper accommodation portion to the lower accommodation portion, such that the cation exchange resin and the anion exchange resin are mixed in the upper accommodation portion and the lower accommodation portion.

4. The ion exchanger according to claim 3, wherein the cation exchange resin has a larger specific gravity than the anion exchange resin.

5. The ion exchanger according to claim 3, wherein an amount of the anion exchange resin filled in the lower accommodation portion is greater than an amount of the cation exchange resin filled in the upper accommodation portion.

6. The ion exchanger according to claim 1, wherein the ion exchanger is arranged on a cooling circuit, through which the refrigerant that cools a fuel cell flows.

7. The ion exchanger according to claim 6, wherein the refrigerant contains ethylene glycol.

8. The ion exchanger according to claim 1, further comprising:
a first mesh arranged transversely to the extension direction of the tube at a lower side of the lower accommodation portion in the first passage; and
a second mesh arranged transversely to the extension direction of the tube at an upper end of the tube.

9. The ion exchanger according to claim 1, wherein the case includes a lower end formed integrally with a refrigerant pipe in which the refrigerant flows.

10. The ion exchanger according to claim 9, wherein the lower end includes a partition wall shared between the case and the refrigerant pipe.

11. The ion exchanger according to claim 10, wherein the inflow hole and the outflow hole are both formed in the partition wall.

* * * * *